United States Patent Office 3,623,314
Patented Nov. 30, 1971

3,623,314
ARRANGEMENT FOR FIXING THE OUTER END
OF A SPIRAL BALANCE SPRING
Jean-Claude Schneider, La Chaux-de-Fonds, Switzerland,
assignor to Fabrique d'Horlogerie Chs. Tissot et Fils
S.A., Le Locle, Neuchatel, Switzerland
Filed Nov. 13, 1970, Ser. No. 89,241
Claims priority, application Switzerland, Dec. 1, 1969,
17,843/69
Int. Cl. G04b 17/32
U.S. Cl. 58—115        5 Claims

ABSTRACT OF THE DISCLOSURE

This is an arrangement for fixing the outer end of a spiral balance spring which regulates the movement of a timepiece. A stud is mounted in a support plate for adjustment by movement about its own axis. The stud is provided with a hollow passage and a pin is driven into this passage. The head of the pin and a portion of the stem adjacent the head coact with a projection of sector section from the stud to hold the end of the balance spring in position.

---

The object of the present invention is to provide an arrangement for anchoring or fixing the outer end of a spiral balance spring which regulates the movement of a timepiece. It comprises a generally cylindrical stud fixed to a supporting plate and a pin engaged in a longitudinal passage in the stud so as to press the flat ribbon or blade of the spiral spring laterally against a projecting portion of the stud.

In arrangements of the type already known, the stud consists of a cylindrical piece driven into an opening of the balance cock. The stud has a central passage to receive the fixing pin which is itself cylindrical. When the fixing pin has been driven into the central passage of the stud, the blade of the spring finds itself pinched between one of its extremities and the projecting part of the stud. However, this arrangement is revealed as not of general usefulness. The putting into place of the fixing pin had to be done while the spiral was in its final position and it was necessary to maintain the outer spiral fixed in an axial sense at the moment when the end of the fixing pin engaged with respect to the projecting part of the stud. The rubbing of the pin against the blade of the spring risked damaging the outer coil of the spiral.

Other arrangements for fixing the outer end of the spiral balance are also known in which the blade of the spiral is pressed closely between two or three surfaces either of the stud or of the stopping means.

Thus, in certain cases the study has a slot which emerges in one of its sides, this slot being adjusted to the length and thickness of the blade of the spring. A stopping means composed of a screw makes it possible to press against one another the two parts of the stud situated on both sides of the slot once the blade of the spring has been inserted into the slot. The spring is pressed between its two edge surfaces and rests upon portions of the surface which belong to the two parts of the stud separated by the slot. In these arrangements the blade of the spring is not completely trapped between four portions of surface; furthermore, it is held in place by the elasticity of the material, so that if the screw is tightened too much the spring runs the risk of buckling and thus losing its shape. In other known arrangements the stud has a diametrical slot into which the extremity of the blade of the spring engages and the stopping means is composed of a ring surrounding the part of the stud which has this slot. Since the lateral surface of the stud is slightly conical, it is possible, by sliding this ring along the stud, to tighten the slot after having introduced the blade of the spring inside. The spring is thus pinched against its two lateral surfaces and its position in elevation is not determinable with accuracy, so that this type of arrangement can give rise to errors in levelling and distortions in the spring.

The modern methods of mounting watch movements, as well as the installations provided for this, make it possible at the present time to carry out the operations of putting the spring into place in a rapid and systematic manner. Machines are available, in effect, which make it possible to measure the frequency of oscillations of the balance wheel-spring unit, to determine the active length of the spring and to cut the latter at the desired length automatically. When the balance wheel is mounted the outer extremity of the spring can therefore be fixed to the stud in a final fashion right from the start. From that time on it is advantageous to be able to carry out this operation in a simple manner by immediately levelling the spring, which involves fixing it in a given direction and at a very precise place.

The purpose of the present invention is to contain a stud element of simple design which is easy to put into use to permit mechanization of the mounting, this means also providing, however, a tightening of the spring on its four surfaces so that the extremity of the last coil is held perfectly in place and turned in a given direction.

To achieve this purpose the arrangement according to the invention is characterized in that the stud has driving means which permit turning it about its axis, these means being situated on the side of the supporting plate and in that pin has, at the base of its stem engaged in said passage, a part the diameter of which is greater than the diameter of the stem, intended for pressing the spring against said projecting part of the stud and a head which rests against the edge of the spring.

In a particular form of execution of the invention the spring has, in the vicinity of the stud, a bend towards the exterior, so that the stud can be placed at the exterior of the last coil and the extremity of the spring can be grasped by tweezers during the mounting. Furthermore, the presence of this bend formed in the spring ahead of the place where it is fixed to the stud facilitates the counting operations because a machine can be used which, after having accurately determined the active length of the spring, makes the bend, by itself, at the desired place. This bend constitutes from then on a reference point for the subsequent mounting operations.

The attached drawing shows, by way of example, an embodiment of the attaching arrangement of the present invention.

Figure 1:
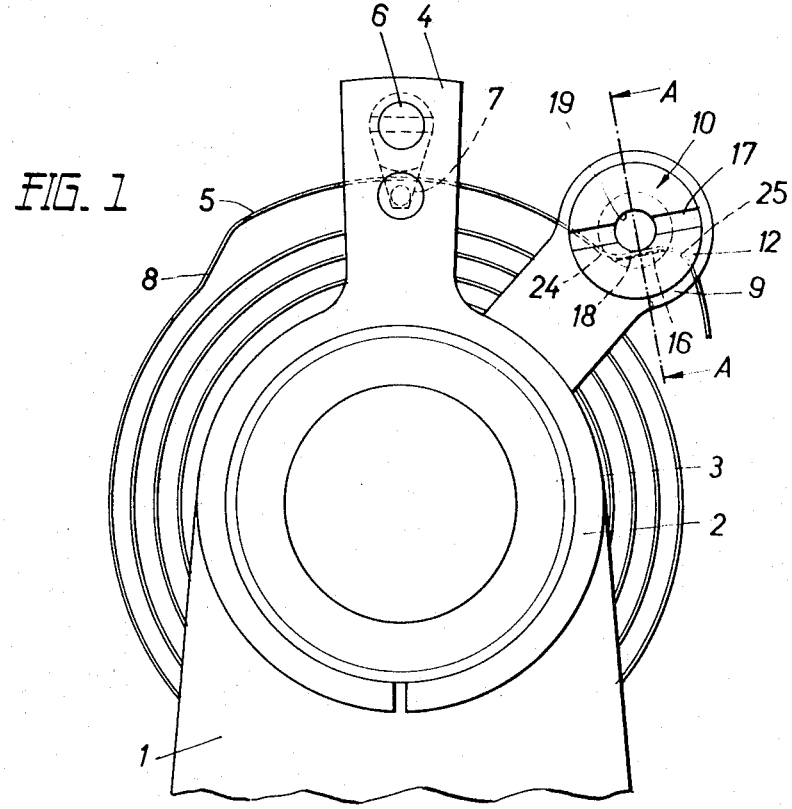
FIG. 1 is a top plan view.

One sees in FIG. 1 the balance cock 1 of the movement of a timepiece and the regulator 2. The regulator 2 is guided around a bearing surface of the cock endstone 3 and includes a radial arm 4 which is provided on its face turned towards the spring 5 with the key 6 and the pin 7 between which the last coil of the spring is passed. This last coil of the spring includes ahead of the regulator a bend 8 as in usual arrangements. The arrangement also includes a movable stud carrier 9 which is also coaxially pivoted in the conventional manner to the regulator 2. The means of mounting the stud carriers is not shown in the drawing.

In another embodiment of the invention the arrangement could also not include a movable stud carrier, the stud described above being able in such a case to be fixed directly on a lateral projection of the balance cock.

Figure 2:
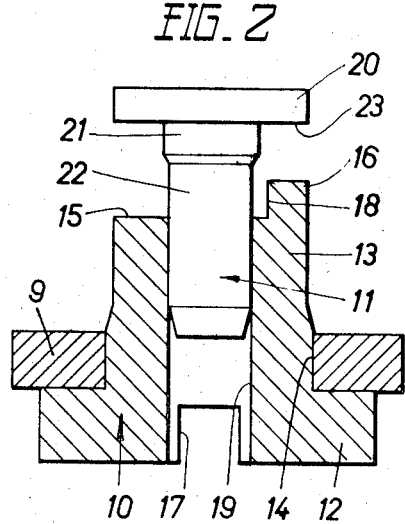
FIG. 2 is an inverted view in section taken along line A—A of FIG. 1, showing the arrangement of the present invention in pre-assembly position.
Figure 3:
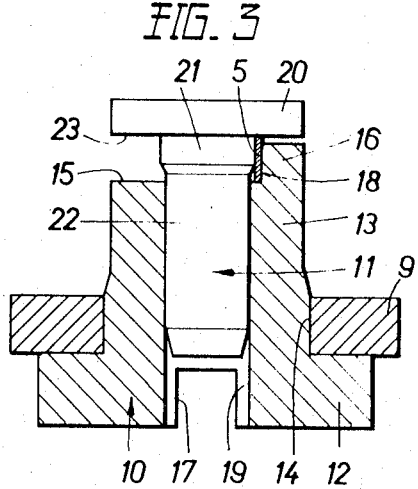
FIG. 3 is a view in section similar to that of FIG. 2, showing the blade of the spring in its assembled position pinched by the stopping means, the FIGS. 2 and 3 being on a larger scale than FIG. 1.

The principal elements of the arrangement for fixing the outer end of the balance spring 5 are shown in FIG. 2. They consist of two pieces: the stud 10 and the blocking pin 11. The stud 10 is a piece of generally cylindrical shape having a head 12 provided with a diametrical slot 17, then a body 13 the part of which adjacent to the head 12 having a cylindrical outer surface 14 which is friction fit in a circular opening provided at the outer end of the arm of the stud carrier 9. The body 13 of the stud 10 extends below the plane of the stud carrier to a level which is situated immediately above the upper level of the spring 5. The arrangement of FIGS. 2 and 3 is thus reversed for a reason which shall be explained further ahead. The body 13 of the stud 10 has on its lower end a flat shoulder 15. Projecting from this shoulder is the catch 16 the presence of which guarantees the precise positioning of the end of the spiral 5. This catch 16 is defined on its outer face by a part of the outer face of the body 13, that is to say a portion of cylindrical surface which is coaxial to the head 12. On the inner face the catch 16 is defined by a flat surface 18 parallel to the axis of the stud. Finally the entire stud 10 is traversed by a cylindrical bore 19 along its axis. The distance between the flat face 18 of the catch 16 and the edge of the circular opening which forms the bore 19 in the shoulder 15 is slightly greater in thickness than the blade of the spring.

The second piece of the fixing arrangement is the cylindrical pin 11. It comprises the following elements which can be obtained by machining for example: at one end of this pin there extends a flat cylindrical head from which projects a stem of which the first portion 21 has an outer cylindrical face of a diameter slightly greater than that of the second part 22 which is the larger of the two. The last mentioned part 22 has a diameter which is so adjusted to that of the bore 19 that the pin 11 can enter the bore 19 only by being driven into it. It will also be seen that the difference between the diameters of the cylindrical parts 21 and 22 of the blocking pin is equal to twice the difference that there is between the distance of the shoulder 18 at the edge of the opening 19 on the one hand and the thickness of the blade of the spring on the other hand. It is also noted that the height of the flat face 18 is slightly less than the width of the blade of the spring and it is the same for the height of the cylindrical portion 21. Thus, as is shown in FIG. 3, when the blocking pin 20 is entirely engaged in the bore 19 while the blade of the spring is placed against the flat face 18, this blade finds itself pressed on its four faces by the parts of the stud and of the blocking pin. Its lateral faces are thus pinched between the flat surface 18 and the cylindrical surface 21. Thus the pressure on the blade of the spring takes place only on a line which is a generatrix of the cylindrical surface 21 so that the location of the pressure is very clearly defined. In addition, the two edges of the spiral are pinched between the shoulder 15 and the shoulder 23 which forms the lower surface of the head 20.

As can be seen from the drawing, the axis of the stud 10 is situated at a distance from the axis of the spring which is slightly greater than the radius of the last part of the outer spire situated ahead of the bend 8. The outer extremity of the spring presents, at the place denoted by 24, a bend towards the exterior and, a bit further on, a second bend 25 which brings the furthest portion of the spring into a position in which it extends considerably in the direction of the coils but at a greater distance from the axis than the last coil. It can be seen from the arrangement described that it suffices to orient the stud 10 in the opening of the stud carrier 9 so that the plane 18 is oblique both with respect to the radius emerging from the axis of the spring and passing by the axis of the stud and with respect to a tangent to the outside coil of the spring, so that with the aid of the bend 24, the portion of the spring included between this bend and bend 8 can extend in the direction of the coils. With this arrangement, the stud is entirely situated outside of the space occupied by the subsequent coils and the arrangement consequently does not risk entering into contact with the coils. Its dimensions can thus be selected in a way that the elements of the arrangement are sufficiently stiff to carry out the functions for which they are intended.

Another particular feature of the arrangement described is that, as a result of the friction fit adjustment of the surface 14 in the opening of the stud carrier 9 and as a result of the slot 17 of the stud 10, it is possible, when the arrangement has been assembled, to make the stud turn slightly in its opening. This feature permits adjusting the driving of the spring between the key 6 and the pin 7 of the regulator without having to change the reference point. In effect, the bend 24 which, owing to the arrangement described, is situated very close to the axis of rotation of the arrangement when the stud is made to turn, does not shift when there is carried out a small movement of rotation of the stud about its axis, so that the required correction can be made without making any change in the adjustment.

The arrangement described presents a particular advantage by the fact that the studding operations can be performed in a rational and even mechanized manner. In effect, in order to determine the active length of the spring after having fixed the collar to the inside extremity of the spring, it is possible to use an automatic machine which automatically determines the active length and which forms in the last coil a bend at the exact place which corresponds to the necessary length. When the spring has thus been folded and cut at the desired length it can be placed, with the collar and the balance wheel, on an emplacement in a position such that the balance wheel turns out to be above the spring. The balance cock with the stud carrier extends under the spring. The stud carrier is provided with the stud 10. The stopping pin 11 is then engaged in the upper extremity of the bore 19, that is to say in the position of FIG. 2. It can be seen that it is extremely easy to grasp the extreme part of the spring with a tweezer and to engage it into the groove formed between the head 20 and the catch 16. It suffices henceforth to check to see that the part of the spring situated immediately after the bend 24 is well placed parallel to the flat surface 18 and extends against this surface and then to press against the head of the pin 20 so as to drive it entirely into the bore 19. The spring is then blocked, as can be seen from FIG. 3. The precision of the devices which cay be used to carry out these operations is such that it is possible, already at the time of the ferruling, to place the plate pin in the correct position with respect to the collar. The alterations regarding adjusting which have to be made after the assembly are thus minimized. Once the external extremity of the spring has been fixed to the stud as indicated above, all of the balance wheel can be grasped with the balance cock, the regulator and the stud carrier, there two elements being joined together by the spring, and mounted on the movement plate. The final correction adjustments can be done with the movable stud carrier although it has been noted in certain cases that it was possible to use a fixed stud carrier, the alterations in adjustment being practically non-existent.

The fixing arrangement described above presents several advantages. First of all it is extremely simple since it is only made up of two pieces. In addition, these two pieces can easily be obtained by machining owing to their symmetrical shape. Secondly, the arrangement fixes the external extremity of the spring by pressing the blade between its four surfaces so that no distortion from buckling or bending can occur. Since the spring is held between four surfaces which are defined in design it is possible to obtain an absolutely perfect flattening without any alteration. Thirdly, as a result of the fact that the stud itself is of an axial symmetry design and owing to the fact that the external coil leads to the arrangement in the immediate vicinity of the axis of the stud, it is possible to adjust the driving of the last coil between the regulator pins by imparting a slight rotation to the stud. This operation does not change the reference. Fourthly, the arrangement is designed so that a spring can be used which has at the extremity of its external coil a bend directed towards the exterior so that the spring can be made ready on an automatic machine which accurately finds its active length. The bend also makes it possible to place the stud slightly outside of the external coil of the spring, which aids in preventing any risk of contact between the studding device and the next-to-last coil and makes it possible to give the stud dimensions such that it offers satisfactory stiffness. Finally, a last advantage of the arrangement described which can be mentioned here is the fact that the positioning of the spring is a very simple operation. Compared with the operations which must be performed when a soldering or a gluing of the spring is called for, the fixing by means of the stopping pin, which can be positioned in advance as shown in FIG. 2, only involves completing the driving of this pin into the bore 19. This operation is extremely simple to do and prevents any distortion or movement of the spring at the time of the positioning.

What is claimed is:
1. An arrangement for fixing the outer end of a spiral balance spring, comprising, a support lying to one side of the balance spring, a stud mounted in said support, said stud having a hollow passage with its mouth in a portion of the stud extending from said supoprt toward said balance spring and means in a portion of said stud extending from said support away from said balance spring to rotate the stud about its axis, a pin having a head and a stem, said stem having a portion driven into said mouth of said hollow bore of said stud, said stud having a projection thereon adjacent said mouth, said stem having a portion of increased diameter adjacent said head of said pin coacting with said projection to press said balance spring thereagainst.

2. An arrangement according to claim 1 in which the means for rotating the stud about its axis is a slotted head.

3. An arrangement according to claim 1, characterized in that said means for rotating stud is composed of a diametrical slot made in a portion of the stud which constitutes the head thereof and projects above the supporting plate.

4. An arrangement according to claim 1, characterized in that the length of the stem of the pin is sufficient for the latter to be fixed to the stud by partially engaging the stem into the passage of the stud and then be brought to its final position after the spring has been enaged between the stem and the projection of the stud.

5. An arrangement according to claim 1, characterized in that the part of the spring which is pressed between the pin and the projection of the stud is situated on the outside of a bend which the spring has at the extremity of its last coil.

References Cited
UNITED STATES PATENTS

| | | | |
|---|---|---|---|
| 789,851 | 5/1905 | Gibson | 58—115 |
| 3,122,880 | 3/1964 | Greiner | 58—115 |
| 3,262,261 | 7/1966 | Monnin | 58—115 |

FOREIGN PATENTS

| | | | |
|---|---|---|---|
| 296,063 | 4/1954 | Switzerland | 58—115 |
| 320,004 | 4/1957 | Switzerland | 58—115 |
| 50,092 | 1/1910 | Switzerland | 58—115 |

RICHARD B. WILKINSON, Primary Examiner

S. A. WAL, Assistant Examiner